(12) United States Patent
Woo et al.

(10) Patent No.: US 11,767,066 B2
(45) Date of Patent: Sep. 26, 2023

(54) FASTENING APPARATUS FOR VEHICLE

(71) Applicant: HYUNDAI MOBIS CO., LTD., Seoul (KR)

(72) Inventors: Hyun Jin Woo, Yongin-si (KR); Hyoun Young Oh, Yongin-si (KR); Ho Youn Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/871,626

(22) Filed: Jul. 22, 2022

(65) Prior Publication Data

US 2023/0055806 A1    Feb. 23, 2023

(30) Foreign Application Priority Data

Aug. 23, 2021   (KR) .................. 10-2021-0110896

(51) Int. Cl.
   *B62D 27/00*   (2006.01)
(52) U.S. Cl.
   CPC .................................. *B62D 27/00* (2013.01)
(58) Field of Classification Search
   CPC ......... B62D 27/00; B62D 27/06; B62D 65/02
   USPC .......................................... 296/35.1, 193.07
   See application file for complete search history.

(56) References Cited

U.S. PATENT DOCUMENTS

| | | | | |
|---|---|---|---|---|
| 2,976,080 A | * | 3/1961 | Moore | B60G 99/004 29/523 |
| 3,032,370 A | * | 5/1962 | Moore | B60G 99/004 411/116 |
| 4,720,075 A | * | 1/1988 | Peterson | B60G 99/004 296/35.1 |
| 4,921,203 A | * | 5/1990 | Peterson | B62D 27/04 267/141.1 |
| 6,416,102 B1 | * | 7/2002 | Howard | F16F 1/387 267/141.1 |
| 2013/0168989 A1 | * | 7/2013 | Sasage | B62D 24/02 296/35.1 |
| 2023/0056169 A1 | * | 2/2023 | Woo | B62D 65/024 |
| 2023/0056302 A1 | * | 2/2023 | Woo | B62D 65/024 |

FOREIGN PATENT DOCUMENTS

| | | | | |
|---|---|---|---|---|
| DE | 10063649 A1 | * | 7/2002 | .......... B62D 25/147 |
| KR | 101317616 B1 | * | 10/2013 | |
| KR | 10-2021-0077367 A | | 6/2021 | |

* cited by examiner

*Primary Examiner* — Hilary L Gutman
(74) *Attorney, Agent, or Firm* — NSIP Law

(57) ABSTRACT

A fastening apparatus for a vehicle may include: a first fastening unit fixed to a first structure; a casing fixed to a second structure and arranged in a manner that faces the first fastening unit; a guide unit formed in the casing in a manner that passes therethrough; and a second fastening unit installed on the guide unit in a manner that is rotatable and enabled to ascend and descend, and fastened to or separated from the first fastening unit according to a rotational direction thereof.

12 Claims, 10 Drawing Sheets

FASTENING APPARATUS FOR VEHICLE

CROSS-REFERENCE TO RELATED APPLICATION

This application claims the benefit under 35 USC 119(a) of Korean Patent Application No. 10-2021-0110896, filed on Aug. 23, 2021 in the Korean Intellectual Property Office, the entire disclosure of which is incorporated herein by reference for all purposes.

BACKGROUND

1. Field

Embodiments of the present disclosure relate to a fastening apparatus for a vehicle and, more particularly, to a fastening apparatus for a vehicle, the apparatus being capable of easily mounting or separating a top hat or a battery module on and from a chassis frame of a purpose-built vehicle (PBV).

2. Description of Related Art

Generally, purpose-built vehicles (PBVs) mean future-oriented vehicles in which, with the development of autonomous traveling technology, an in-vehicle space is freely utilized suitably for an application to provide a customized service necessary to a user during a traveling time to a destination.

These PBVs have a structure where a top hat designed suitably for the user's intended purpose, that is, an upper portion of a vehicle frame, is combined with a skateboard-shaped chassis frame underneath which a battery module is widely arranged. Accordingly, there is a need for development of a novel fastening structure where the top hat or the battery module can be easily separated, for replacement, from the vehicle chassis frame and where assembly automation can be realized.

An example of the related art is disclosed in Korean Patent Application Publication No. 10-2021-0077367 published on Jun. 25, 2021, titled "Vehicle Body Assembly Structure".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments are directed to a fastening apparatus for a vehicle, the apparatus being capable of easily mounting or separating a top hat or a battery module on and from a chassis frame of a purpose-built vehicle (PBV).

In an embodiment, a fastening apparatus for a vehicle may include: a first fastening unit fixed to a first structure; a casing fixed to a second structure and arranged in a manner that faces the first fastening unit; a guide unit formed in the casing in a manner that passes therethrough; and a second fastening unit installed on the guide unit in a manner that is rotatable and enabled to ascend and descend, and fastened to or separated from the first fastening unit according to a rotational direction thereof.

In the fastening apparatus, the guide unit may include: a first section passing through one side of the casing, the first fastening unit being inserted into the first section; a second section passing through the other side of the casing, the second fastening unit being inserted into the second section; and a third section arranged between the first section and the second section and converting rotational motion of the second fastening unit into straight-line reciprocating motion.

In the fastening apparatus, inner circumferential surfaces of the first section and the second section may be spaced a predetermined distance away from an outer circumferential surface of the second fastening unit.

In the fastening apparatus, the first section and the second section may be formed in such a manner as to have a greater diameter than the third section.

In the fastening apparatus, a screw thread may be provided on an inner circumferential surface of the third section and may be combined with an outer circumferential surface of the second fastening unit in a nut-bolt fastening manner.

In the fastening apparatus, the first fastening unit may include: a stationary portion seated on an internal surface of the first structure for being fixed thereto; an extension portion extending from the stationary portion, a screw thread being provided on an outer circumferential surface of the extension portion; and an entry guidance portion extending from the extension portion and guiding the extension portion in entering the second fastening unit.

In the fastening apparatus, the entry guidance portion may be formed in such a manner that a width thereof decreases toward an end thereof.

In the fastening apparatus, the second fastening unit may include: a body portion arranged inside the guide unit, a screw thread being provided on an outer circumferential surface and an inner circumferential surface of the body portion; and a tool connection portion extending from the body portion in a manner that is connectable to a working tool.

In the fastening apparatus, the tool connection portion may be formed in such a manner as to have a polygonal cross section.

In the fastening apparatus, in a case where the body portion is positioned in the second section, the tool connection portion may protrude to under the casing.

The fastening apparatus may further include a separation prevention portion preventing the second fastening unit from being separated from the second section.

In the fastening apparatus, the separation prevention portion may extend from an edge of the other side of the casing toward the second section.

The fastening apparatus may further include a tool-dedicated hole formed in the separation prevention portion in a manner that passes therethrough, the working tool entering the tool-dedicated hole.

In the fastening apparatus, the tool connection portion may have a smaller area than the tool-dedicated hole.

In the fastening apparatus, the tool-dedicated hole may connect with the second section.

In the fastening apparatus for a vehicle according to the present disclosure, components necessary to fasten the first structure and the second structure to each other are realized as one assembly. Thus, a machine and manpower can be prevented from being wasted in an additional feeding operation during assembling, and the components can be prevented from being lost.

In addition, in the fastening apparatus for a vehicle according to the present disclosure, by only simple operation of the working tool, the first fastening unit and the second fastening unit can be repeatedly fastened to and separated from each other. Thus, the efficiency and consistency of assembling can be improved.

In addition, in the fastening apparatus for a vehicle according to the present disclosure, with the third section combined with the outer circumferential circumference of the second fastening unit in a nut-bolt fastening manner, the second fastening unit is aligned to a home position thereof with respect to the first fastening unit in a process of fastening the first fastening unit and the second fastening unit to each other. Thus, erroneous assembling can be prevented.

In addition, in the fastening apparatus for a vehicle according to the present disclosure, when the first fastening unit and the second fastening unit are fastened to each other with the first section formed in such a manner as to have a greater diameter than the third section and having the inner circumferential surface on which the screw thread is not formed, phenomena, such as one in which the second fastening unit is stuck due to double nut-bolt fastening combination, can be prevented.

In addition, in the fastening apparatus for a vehicle according to the present disclosure, when the second fastening unit and the first fastening unit are separated from each other with the second section formed in such a manner to have a greater diameter than the third section and having the inner circumferential surface on which the screw thread is not formed, the second fastening unit is caused to be rotated without load thereon. Thus, the separation prevention portion can be prevented from being damaged due to the continuous straight-line motion of the second fastening unit.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
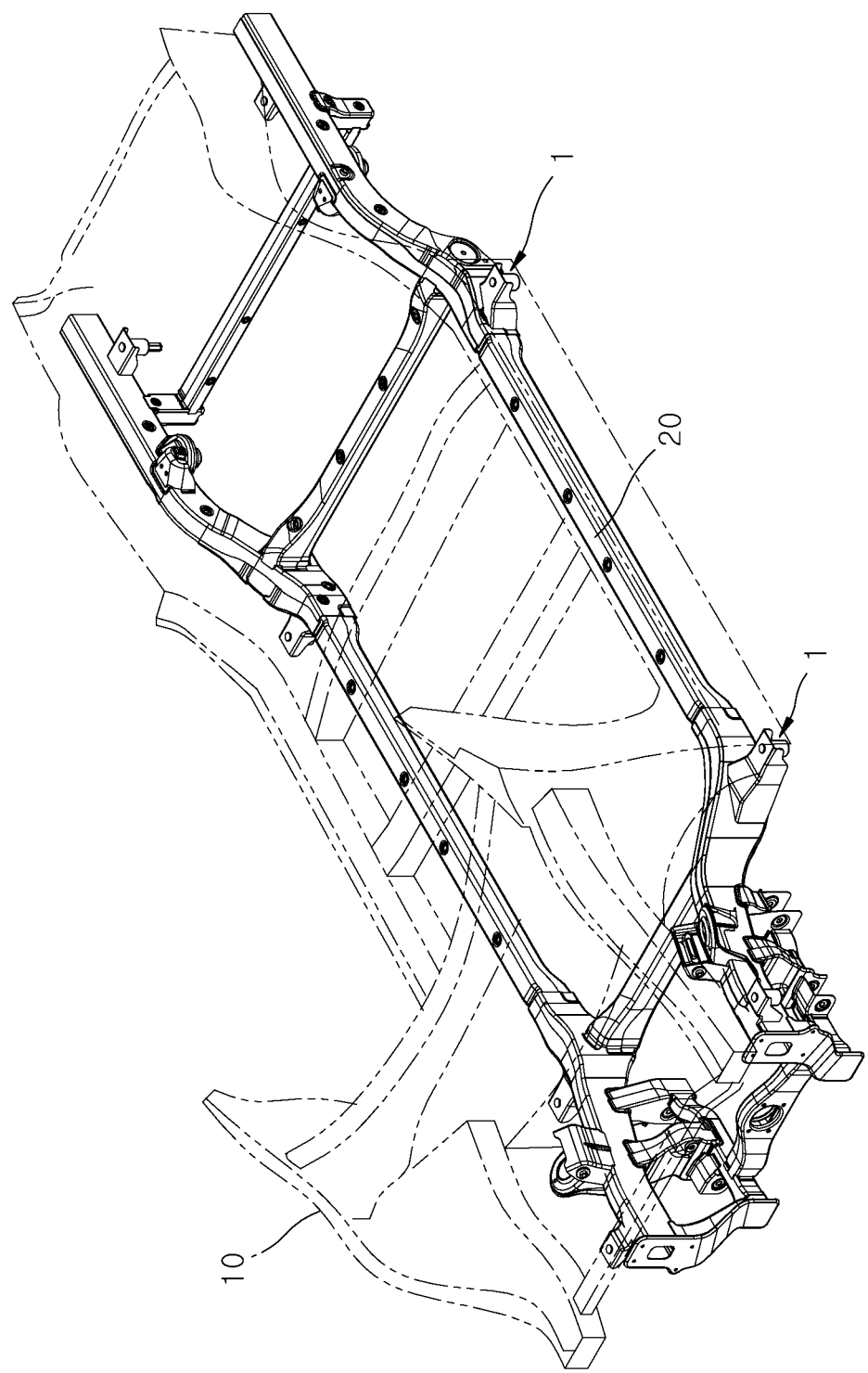
FIG. 1 is a view schematically illustrating a state where a fastening apparatus for a vehicle according to an embodiment of the present disclosure is installed.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

For clarity and convenience in description, the thicknesses of lines and the sizes of constituent elements may be exaggeratedly illustrated in the drawings. In addition, a term defined by considering a function of a constituent element according to the present disclosure to which the term is assigned will be used below and may vary according to the user's or manager's intention or to practices in the art. Therefore, the term should be defined in context in light of the present specification.

Figure 2:
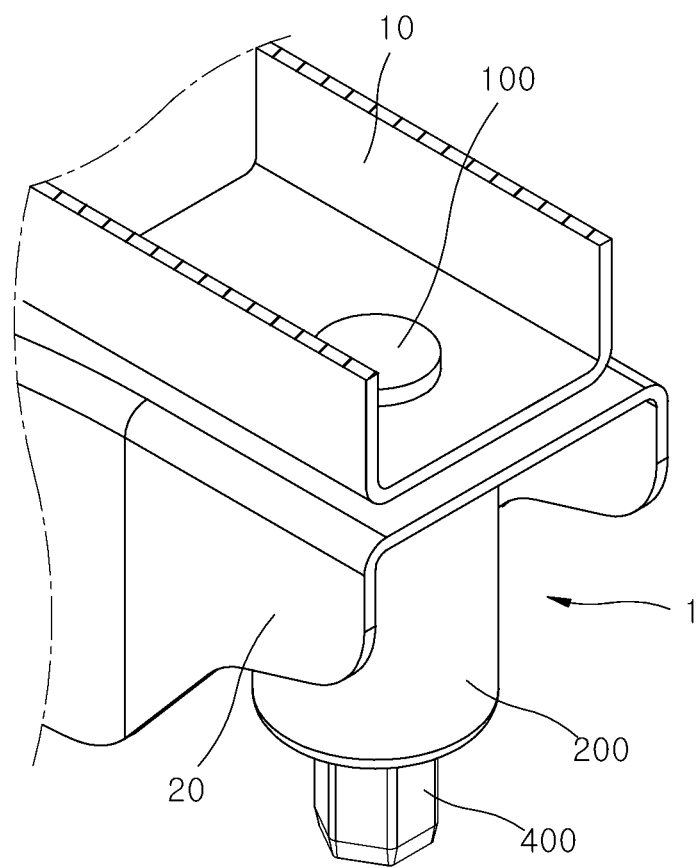
FIG. 2 is a perspective view schematically illustrating a configuration of the fastening apparatus for a vehicle according to the embodiment of the present disclosure.
Figure 3:
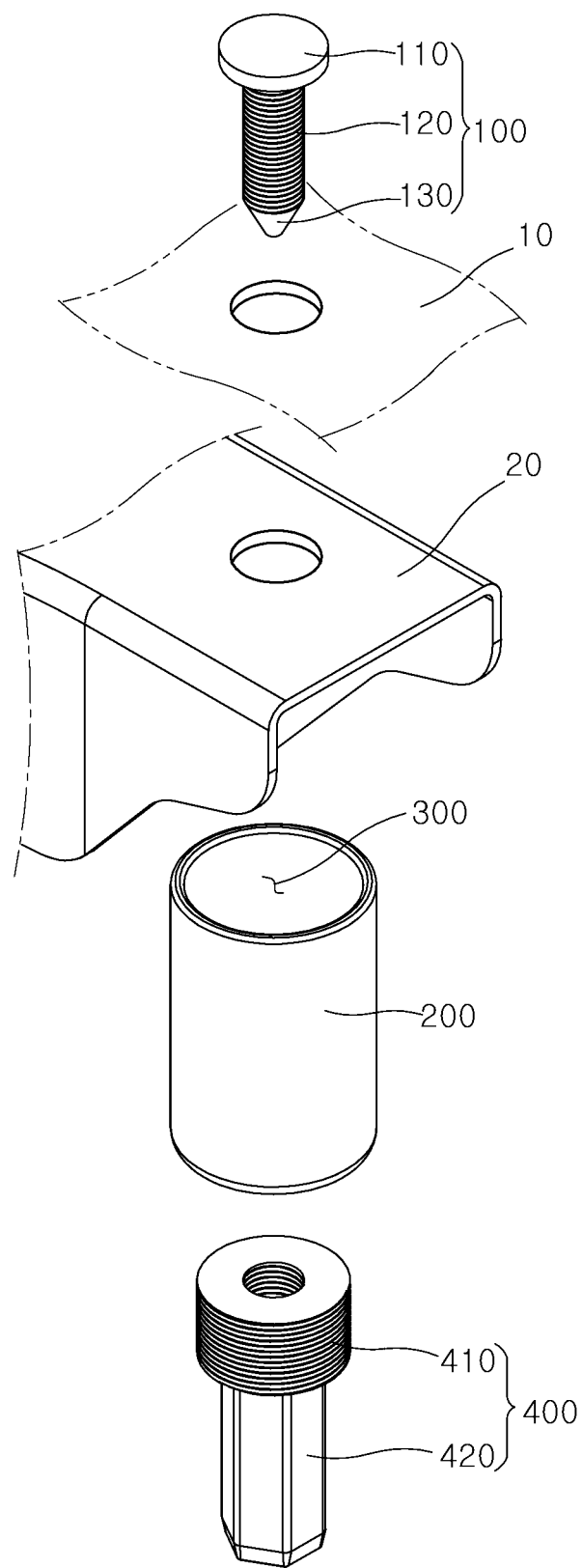
FIG. 3 is an exploded perspective view schematically illustrating the configuration of the fastening apparatus for a vehicle according to the embodiment of the present disclosure.
Figure 4:
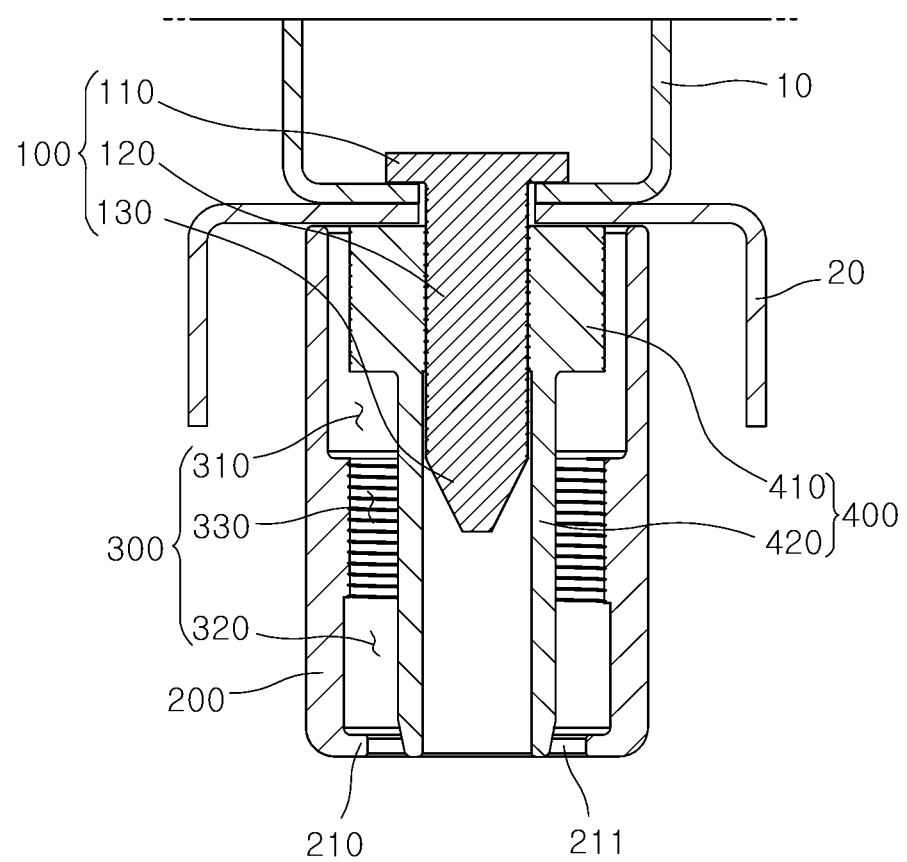
FIG. 4 is a cross-sectional view schematically illustrating the configuration of the fastening apparatus for a vehicle according to the embodiment of the present disclosure.

FIG. 1 is a view schematically illustrating a state where a fastening apparatus for a vehicle according to an embodiment of the present disclosure is installed. FIG. 2 is a perspective view schematically illustrating a configuration of the fastening apparatus for a vehicle according to the embodiment of the present disclosure. FIG. 3 is an exploded perspective view schematically illustrating the configuration of the fastening apparatus for a vehicle according to the embodiment of the present disclosure. FIG. 4 is a cross-sectional view schematically illustrating the configuration of the fastening apparatus for a vehicle according to the embodiment of the present disclosure.

With reference to FIGS. 1 to 4, a fastening apparatus 1 for a vehicle according to the embodiment of the present disclosure includes a first fastening unit 100, a casing 200, a guide unit 300, and a second fastening unit 400.

A first structure 10 and a second structure 20 that will be described below may be exemplified by a top hat and a chassis frame, respectively. The top hat corresponds to a vehicle frame. The chassis frame is installed under a vehicle body and structurally supports the vehicle body. The top hat and the chassis frame can be customized and replaced according to a user's purpose. However, the first structure 10 and the second structure 20 are not limited thereto. Through various designs, the first structure 10 and the second structure 20 may possibly be changed to different structures, respectively, for example, a chassis frame and a battery module, that can be fastened to, and separated from each other in the vehicle.

The first fastening unit 100 is fixed to the first structure 10 and is fastened to the second fastening unit 400 described below. Thus, the first fastening unit 100 fixes the second structure 20 and the first structure 10 with respect to each other.

Figure 5:
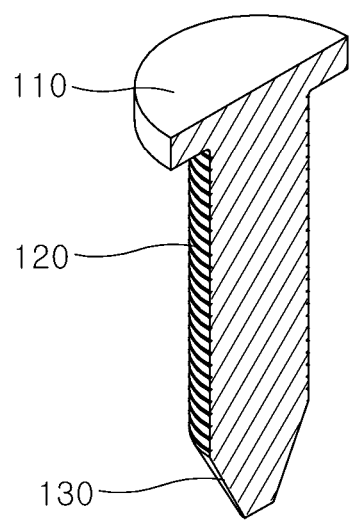
FIG. 5 is a cross-sectional view schematically illustrating a configuration of a first fastening unit according to the embodiment of the present disclosure.

FIG. 5 is a cross-sectional view schematically illustrating a configuration of the first fastening unit 100 according to the embodiment of the present disclosure.

With reference to FIGS. 1 to 5, the first fastening unit 100 according to the embodiment of the present disclosure includes a stationary portion 110, an extension portion 120, and an entry guidance portion 130.

The stationary portion 110 forms an exterior appearance of an upper portion of the first fastening unit 100 according to the embodiment of the present disclosure and supports both the extension portion 120 and the entry guidance portion 130 that will be described below. The stationary portion 110 according to the embodiment of the present disclosure is seated on an internal surface of the first structure 10 for being fixed thereto. The stationary portion 110 may be welded to or adhered to the internal surface of the first structure 10 and thus may be integrally combined with the first structure 10. In addition to a circular shape illustrated in FIG. 5, the stationary portion 110 may be specifically design-changed to have various specific shapes in such a manner as to be seated on the internal surface of the first structure 10 for being fixable thereto.

The extension portion 120 extends from the stationary portion 110 and forms an exterior appearance of a center portion of the first fastening unit 100 according to the embodiment of the present disclosure. The extension portion 120 according to the embodiment of the present disclosure may be formed in the shape of a bar in such a manner as to vertically extend downward from an internal surface of the stationary portion 110. The extension portion 120 passes through the internal surface of the first structure 10 and extends out of the first structure 10. A screw thread is formed, along the lengthwise direction thereof, on an outer circumferential surface of the extension portion 120 in such a manner that the extension portion 120 is combined, in a nut-bolt fastening manner, with the second fastening unit 400 described below.

The entry guidance portion 130 extends from the extension portion 120 and forms an exterior appearance of a lower portion of the first fastening unit 100 according to the embodiment of the present disclosure. The entry guidance portion 130 is provided in such a manner as to be able to guide the extension portion 120 in entering the second fastening unit 400 when the first fastening unit 100 and the second fastening unit 400 are fastened to each other. The entry guidance portion 130 according to the embodiment of the present disclosure vertically extends downward from a lower end portion of the extension portion 120. The entry guidance portion 130 is provided in such a manner that the width thereof decreases toward the end thereof. Accordingly, the entry guidance portion 130 may be formed in such a manner as to have a substantially conical shape.

The casing 200 is fixed to the second structure 20 and is arranged in a manner that faces the first fastening unit 100. The casing 200 supports both the guide unit 300 and the second fastening unit 400 that will be described below. The casing 200 may be directly fixed to the second structure 20. As illustrated in FIGS. 2 and 4, it is also possible that the casing 200 is fixed to a bracket or the like that is separately provided to the second structure 20.

Figure 6:
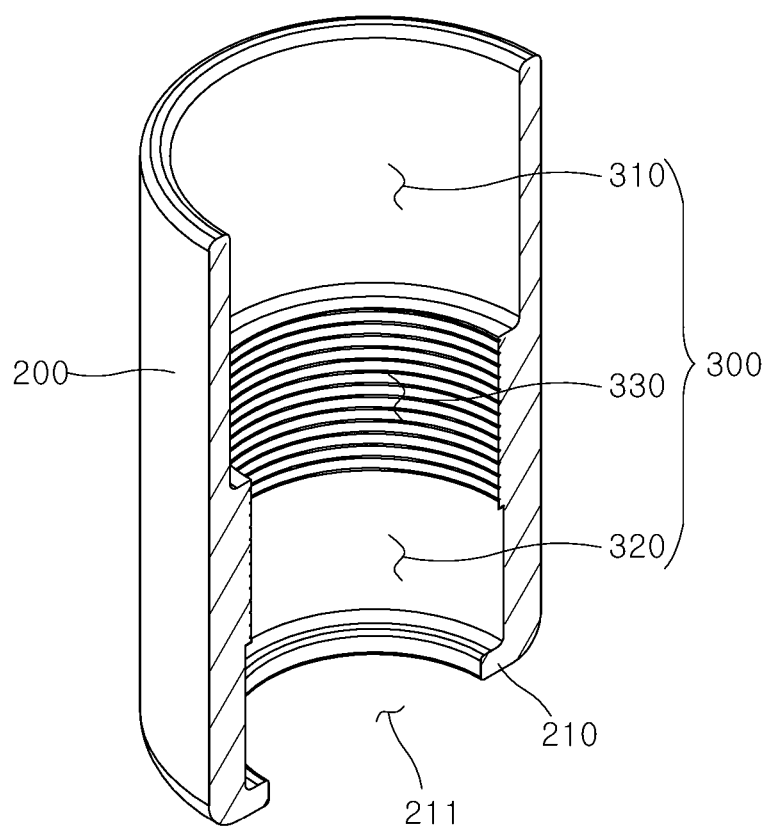
FIG. 6 is a cross-sectional view schematically illustrating configurations of a casing and a guide unit according to the embodiment of the present disclosure.

FIG. 6 is a cross-sectional view schematically illustrating configurations of the casing 200 and the guide unit 300 according to the embodiment of the present disclosure.

With reference to FIGS. 1 to 6, the casing 200 according to the embodiment of the present disclosure may be formed in the shape of a hollow cylinder that is open at the upper and lower end portions in such a manner as to have a space inside. The guide unit 300 described below is formed in the space. By welding or bonding, an upper end portion of the casing 200 may be integrally combined with a lower surface of the bracket extending from the second structure 20. The casing 200 is arranged in such a manner that an upper surface thereof faces an end portion of the first fastening unit 100 fixed to the first structure 10, that is, a lower end portion of the entry guidance portion 130.

A separation prevention portion 210 may be provided on a lower end portion of the casing 200. The separation prevention portion 210 prevents the second fastening unit 400 described below from being separated from a second section 320 of the guide unit 300. The separation prevention portion 210 according to the embodiment of the present disclosure may be formed in the shape of a circular plate in such a manner as to horizontally extend from an edge of the lower end portion of the casing 200 toward the second section 320, that is, a central axis of the casing 200. A tool-dedicated hole 211 is formed in a center portion of the separation prevention portion 210. A working tool 30, such as a motor-driven drill or a socket wrench enters the tool-dedicated hole 211.

The guide unit 300 is formed in the casing 200 in a manner that passes therethrough. The guide unit 300 guides rotating of and ascending and descending of the second fastening unit 400 described above.

The guide unit 300 according to the embodiment of the present disclosure may include a first section 310, the second section 320, and a third section 330.

The first section 310 passes through one side of the casing 200, and the first fastening unit 100 is inserted into the first section 310. The first section 310 according to the embodiment of the present disclosure may be formed in the shape of a hole in such a manner as to vertically pass through an upper surface of the casing 200 along a lengthwise direction of the casing 200.

The second section 320 passes through the other side of the casing 200, and the second fastening unit 400 is inserted into the second section 320. The second section 320 according to the embodiment of the present disclosure may be formed in the shape of a hole in such a manner as to vertically pass through a lower surface of the casing 200 along the lengthwise direction of the casing 200. The second section 320 is arranged to be spaced a predetermined distance away from the first section 310 along the lengthwise direction of the casing 200. In this case, the predetermined distance the first section 310 and the second section 320 are spaced apart may have a value corresponding to a length of the third section 330 described below. A lower surface of the second section 320 passes through the center portion of the separation prevention portion 210 and connects with the tool-dedicated hole 211.

The third section 330 is arranged between the first section 310 and the second section 320 and converts rotational motion of the second fastening unit 400 into straight-line reciprocating motion. The third section 330 according to the embodiment of the present disclosure may be formed in the shape of a hole in such a manner that upper and lower surfaces thereof connect with a lower surface of the first section 310 and an upper surface of the second section 320, respectively. Accordingly, the sections connect with each other along the lengthwise direction of the casing 200 in this order: the first section 310, the third section 330, and the second section 320.

A screw thread is provided on an inner circumferential surface of the third section 330, and thus the third section 330 may be, in a nut-bolt fastening manner, combined with the second fastening unit 400, more specifically, an outer circumferential surface of a body portion 410. Accordingly, when the second fastening unit 400 is rotated, along the third section 330, the second fastening unit 400 may reciprocate in a straight line in a direction parallel to a lengthwise direction of the guide unit 300. In addition, when the first fastening unit 100 and the second fastening unit 400 are fastened to each other, with the third section 330, the second fastening unit 400 is aligned to a home position thereof with respect to the first fastening unit 100 without a central axis thereof being inclined. Thus, the second fastening unit 400 can be prevented from being erroneously assembled.

Respective inner circumferential surfaces of the first section 310 and the second section 320 are formed to be flat surfaces without screw threads thereon. The respective inner circumferential surfaces of the first section 310 and the second section 320 are arranged to be spaced a predetermined distance away from the second fastening unit 400, more particularly, an outer circumferential surface of the body portion 410. In this case, the first section 310 and the second section 320 may be formed in such a manner as to have a greater diameter than the third section 330. Accordingly, when the first fastening unit 100 and the second fastening unit 400 are fastened to each other, the first section 310 can prevent phenomena, such as one in which the second fastening unit 400 is stuck due to double nut-bolt-fastening combination at an inner circumferential surface and an outer circumferential surface of the second fastening unit 400. In addition, when the second fastening unit 400 and the first fastening unit 100 are separated from each other, the second section 320 guides the second fastening unit 400 in rotating without load inside the second section 320. Thus, a collision with the separation prevention portion 210 due to continuous straight-line motion of the second fastening unit 400 can be prevented.

The second fastening unit 400 is installed on the guide unit 300 in a manner that is rotatable and enabled to ascend and descend. The second fastening unit 400 is fastened to or separated from the first fastening unit 100, depending on a rotational direction thereof. Thus, a state where the first structure 10 and the second structure 20 are combined is changed.

Figure 7:
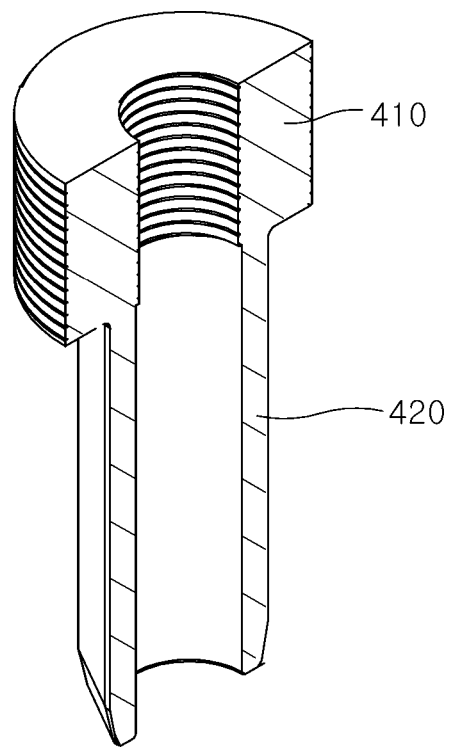
FIG. 7 is a cross-sectional view schematically illustrating a configuration of a second fastening unit according to the embodiment of the present disclosure.

FIG. 7 is a cross-sectional view schematically illustrating a configuration of the second fastening unit 400 according to the embodiment of the present disclosure.

With reference to FIGS. 1 to 7, the second fastening unit 400 according to the embodiment of the present disclosure includes the body portion 410 and a tool connection portion 420.

The body portion 410 forms an exterior appearance of an upper portion of the second fastening unit 400 according to the embodiment of the present disclosure and supports the tool connection portion 420 described above. The body portion 410 according to the embodiment of the present disclosure is formed in such a manner as to have the shape of a hollow cylinder and is arranged inside the guide unit 300. The body portion 410 may be formed in such a manner that a diameter thereof corresponds to a diameter of the third section 330. Accordingly, inside the guide unit 300, the body portion 410 may be smoothly rotated and may ascend and descend.

Screw threads are provided on the outer circumferential surface and inner circumferential surface, respectively, of the body portion 410. The screw threads are combined, in a nut-bolt fastening manner, with the third section 330 and the extension portion 120, respectively. It is possible that a pitch and an angle of the screw thread formed on each of the outer circumferential surface and the inner circumferential surface of the body portion 410 are variously design-changed within a range where rotation of the body portion 410 can be smoothly guided although the outer circumferential surface and the inner circumferential surface of the body portion 410 are combined, in a nut-bolt fastening manner, with the third section 330 and the extension portion 120, respectively, at the same time at the interface between the first section 310 and the third section 330.

The tool connection portion 420 extends from the body portion 410 and forms an exterior appearance of a lower portion of the second fastening unit 400 according to the embodiment of the present disclosure. The tool connection portion 420 is provided in a manner that is connectable with the working tool 30, such as a motor-driven drill or a socket wrench. The tool connection portion 420 according to the embodiment of the disclosure may be formed in the shape of a bar in such a manner as to vertically extend downward from a lower surface of the body portion 410. In a case where the body portion 410 is positioned at the second section 320, the tool connection portion 420 is formed in such a manner as to have such a length that a lower end portion thereof protrudes to under the casing 200 through the tool-dedicated hole 211. Accordingly, the tool connection portion 420 can improve the accessibility to the working tool 30. The tool connection portion 420 may be formed in such a manner as to have a smaller area than the tool-dedicated hole 211. Accordingly, it is possible that the tool connection portion 420 smoothly ascends and descends inside the guide unit 300 without undergoing interference with the tool-dedicated hole 211. The tool connection portion 420 may be formed in such a manner as to have a polygonal cross section so that the tool connection portion 420 may be easily connected to the working tool 30 and at the same time may efficiently receive a rotational force from the working tool 30.

A process of assembling the fastening apparatus 1 for a vehicle according to the embodiment of the present disclosure will be described in detail below.

Figure 8:
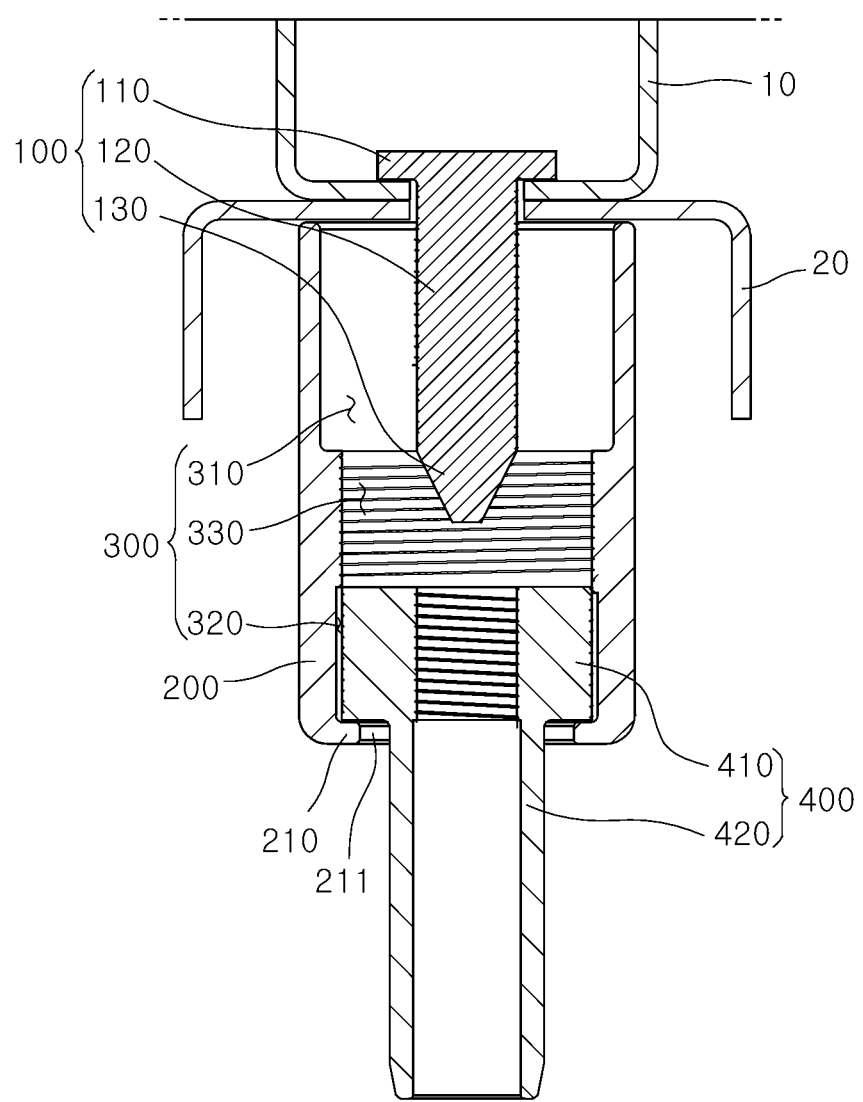
FIGS. 8 to 10 are views each schematically illustrating a process of assembling the fastening apparatus for a vehicle according to the embodiment of the present disclosure.
Figure 9:
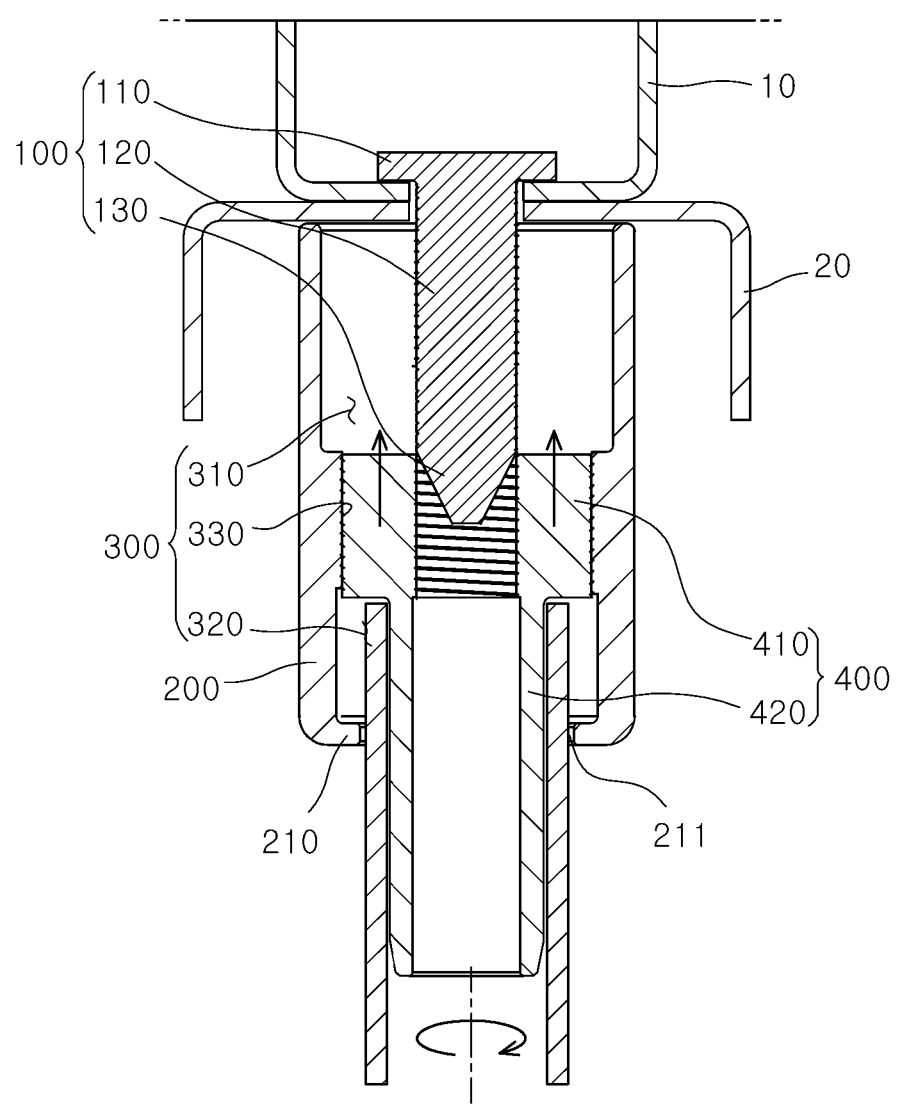
Figure 10:
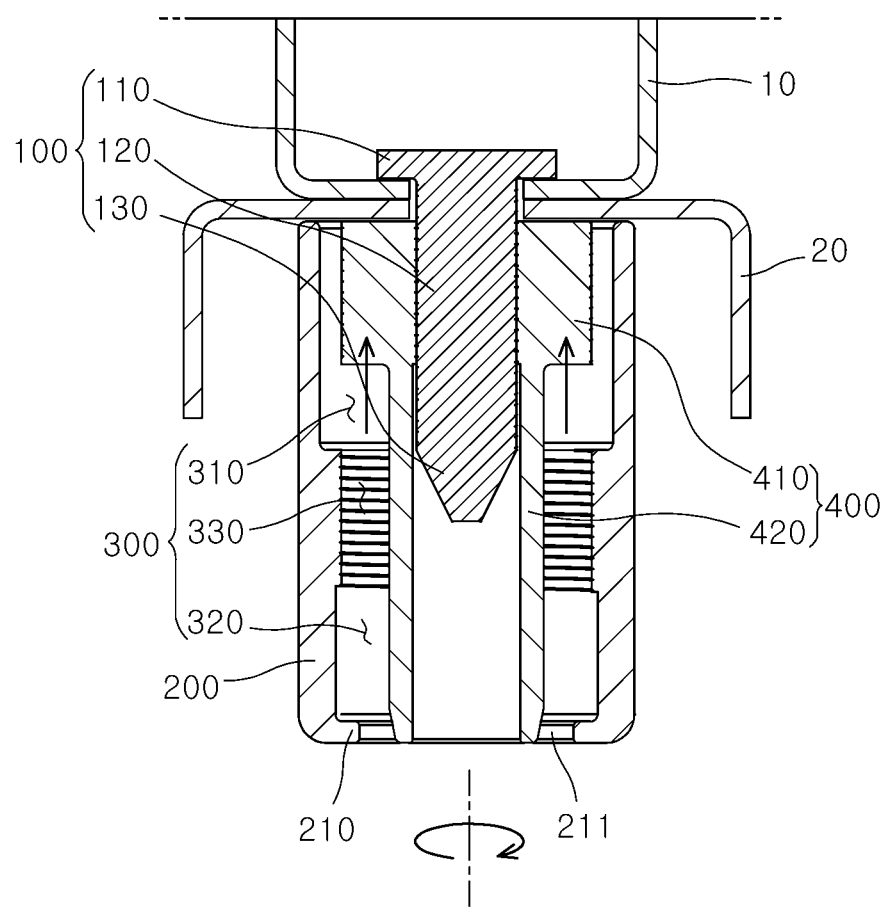

FIGS. 8 to 10 are views each schematically illustrating a process of assembling the fastening apparatus for a vehicle according to the embodiment of the present disclosure.

With reference to FIGS. 8 to 10, the first structure 10 is seated on the top of the second structure 20, and thus the extension portion 120 and the entry guidance portion 130 of the first fastening unit 100 fixed to the first structure 10 are inserted into the first section 310.

The second fastening unit 400 is maintained in a state where the body portion 410 is positioned inside the second section 320 and where the tool connection portion 420 protrudes from the lower end portion of the casing 200.

The lower surface of the body portion 410 is brought into contact with an upper surface of the separation prevention portion 210 and thus is prevented from being separated from the second section 320.

Subsequently, the tool connection portion 420 is connected to the working tool 30. By operation of the working tool 30, the second fastening unit 400 is rotated about a central axis thereof and at the same time ascends.

The second fastening unit 400 ascends a predetermined distance, and thus an upper end portion of the body portion 410 passes by a border line between the second section 320 and the third section 330. Consequently, the outer circumferential surface of the body portion 410 is engaged with the inner circumferential surface of the third section 330 and thus is combined therewith in a nut-bolt fastening manner.

The body portion 410 is aligned in such a manner that a central axis of the inner circumferential surface thereof coaxially faces a central axis of the extension portion 120. The body portion 410 is rotated about a central axis thereof and ascends toward the extension portion 120.

In this case, the working tool 30 is inserted into the guide unit 300 through the tool-dedicated hole 211, and thus may be kept connected to the tool connection portion 420.

The upper end portion of the body portion 410 passes by a border line between the third section 330 and the first section 310, and thus the extension portion 120 is inserted into the body portion 410. In this case, the entry guidance portion 130 is formed in such a manner that a width thereof decreases toward the end thereof, and thus the extension portion 120 may be smoothly inserted into the body portion 410.

An outer circumferential surface of the extension portion 120 inserted into the body portion 410 is combined with an inner circumferential surface of the body portion 410 in a nut-bolt fastening manner.

Subsequently, the body portion 410 is continuously rotated in a state of being engaged with the extension portion 120 and ascend along a lengthwise direction of the extension portion 120.

In a case where a lower end portion of the body portion 410 passes by the border line between the third section 330 and the first section 310, the outer circumferential surface of the body portion 410 is no longer combined in a nut-bolt fastening manner, and only the inner circumferential surface thereof is combined with the outer circumferential surface of the extension portion 120 in a nut-bolt fastening manner. Thus, the body portion 410 may be more smoothly rotated.

The first fastening unit 100 and the second fastening unit 400 are completely fastened to each other at a point where an upper surface of the body portion 410 is brought into contact with an internal surface of the second structure 20. A position of the first structure 10 is fixed with respect to the second structure 20.

Subsequently, the working tool 30 is separated from out of the casing 200 through the tool-dedicated hole 211.

The first fastening unit 100 and the second fastening unit 400 are separated from each other in the reverse order to the order in which the first fastening unit 100 and the second fastening unit 400 that are described above are fastened to each other.

In this case, the upper end portion of the body portion 410 passes by the border line between the third section 330 and the second section 320, and thus the body portion 410 is rotated at the same position inside the second section 320 without ascending. Accordingly, the body portion 410 can be prevented from excessively descending due to erroneous operation or the like of the working tool 30, and the separation prevention portion 210 can be prevented from being damaged.

The embodiment of the disclosure is described only in an exemplary manner with reference to the drawings. It would be understandable by a person of ordinary skill in the art to which the present disclosure pertains that various modifications may possibly be made to the embodiment and that various equivalents thereof may possibly be implemented.

Thus, the true technical scope of the disclosure should be defined by the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A fastening apparatus for a vehicle, comprising:
a first fastening unit configured to be fixed to a first structure;
a casing, configured to be fixed to a second structure, disposed to face the first fastening unit;
a guide unit formed within the casing, wherein the first fastening unit is configured to extend into the guide unit; and
a second fastening unit, configured to rotatably ascend and descend, and fasten or separate from the first fastening unit,
wherein the guide unit comprises:
a first section, formed on an inner side of the casing, configured to accommodate the first fastening unit;
a second section, formed on another inner side of the casing, configured to accommodate the second fastening unit; and
a third section, formed between the first section and the second section, configured to convert rotational motion of the second fastening unit into a straight-line reciprocating motion; and
wherein inner circumferential surfaces of the first section and the second section are spaced apart at a predetermined distance away from an outer circumferential surface of the second fastening unit,
wherein diameters of the first section and the second section are greater than a diameter of the third section.

2. The fastening apparatus of claim 1, wherein the first fastening unit comprises:
a stationary portion configured to sit on an internal surface of the first structure when fixed thereto;
an extension portion extending from the stationary portion and having a screw thread on an outer circumferential surface thereof; and
an entry guidance portion extending from the extension portion to guide the extension portion into the second fastening unit.

3. The fastening apparatus of claim 2, wherein the entry guidance portion is formed to have a decreasing width toward an end thereof.

4. A fastening apparatus for a vehicle, comprising:
a first fastening unit configured to be fixed to a first structure;
a casing, configured to be fixed to a second structure, disposed to face the first fastening unit;
a guide unit formed within the casing; and
a second fastening unit, configured to rotatably ascend and descend, and fasten or separate from the first fastening unit,
wherein the guide unit comprises:
a first section, formed on an inner side of the casing, configured to accommodate the first fastening unit;
a second section, formed on another inner side of the casing, configured to accommodate the second fastening unit; and
a third section, formed between the first section and the second section, configured to convert rotational motion of the second fastening unit into a straight-line reciprocating motion; and
wherein a screw thread is disposed on an inner circumferential surface of the third section to combine with an outer circumferential surface of the second fastening unit in a nut-bolt fastening manner.

5. A fastening apparatus for a vehicle, comprising:
a first fastening unit configured to be fixed to a first structure;
a casing, configured to be fixed to a second structure, disposed to face the first fastening unit;
a guide unit formed within the casing; and
a second fastening unit, configured to rotatably ascend and descend, and fasten or separate from the first fastening unit,
wherein the guide unit comprises:
a first section, formed on an inner side of the casing, configured to accommodate the first fastening unit;
a second section, formed on another inner side of the casing, configured to accommodate the second fastening unit; and
a third section, formed between the first section and the second section, configured to convert rotational motion of the second fastening unit into a straight-line reciprocating motion; and
wherein the second fastening unit comprises:
a body portion disposed inside the guide unit, screw threads disposed on an outer circumferential surface and an inner circumferential surface of the body portion; and
a tool connection portion extending from the body portion to be connectable to a working tool.

6. The fastening apparatus of claim 5, wherein the tool connection portion has a polygonal cross section.

7. The fastening apparatus of claim 5, wherein when the body portion is positioned in the second section, the tool connection portion protrudes from the casing.

8. The fastening apparatus of claim 5, further comprising:
a separation prevention portion configured to prevent the second fastening unit from being separated from the second section.

9. The fastening apparatus of claim 8, wherein the separation prevention portion extends from an edge of the other side of the casing toward the second section.

10. The fastening apparatus of claim 8, further comprising:
a tool-dedicated hole, formed through in the separation prevention portion, configured to receive the working tool.

11. The fastening apparatus of claim 10, wherein an area of the tool connection portion is smaller than an area of the tool-dedicated hole.

12. The fastening apparatus of claim 10, wherein the tool-dedicated hole connects with the second section.

* * * * *